US009344844B2

(12) United States Patent
Zhu

(10) Patent No.: US 9,344,844 B2
(45) Date of Patent: May 17, 2016

(54) MOBILE INTERNET PROTOCOL (IP) LOCATION

(71) Applicant: TeleCommunication Systems, Inc., Annapolis, MD (US)

(72) Inventor: Yinjun Zhu, Sammamish, WA (US)

(73) Assignee: Telecommunication Systems, Inc., Annapolis, MD (US)

( * ) Notice: Subject to any disclaimer, the term of this patent is extended or adjusted under 35 U.S.C. 154(b) by 0 days.

(21) Appl. No.: 14/750,056

(22) Filed: Jun. 25, 2015

(65) Prior Publication Data

US 2015/0296337 A1 Oct. 15, 2015

Related U.S. Application Data

(63) Continuation of application No. 14/198,027, filed on Mar. 5, 2014, now Pat. No. 9,173,059, which is a continuation of application No. 13/402,406, filed on Feb. 22, 2012, now Pat. No. 8,682,321.

(60) Provisional application No. 61/457,316, filed on Feb. 25, 2011, provisional application No. 61/573,086, filed on Aug. 30, 2011.

(51) Int. Cl.
H04W 24/00 (2009.01)
H04W 4/02 (2009.01)
H04W 64/00 (2009.01)
H04L 29/12 (2006.01)

(52) U.S. Cl.
CPC ........... *H04W 4/02* (2013.01); *H04L 29/12037* (2013.01); *H04L 61/2514* (2013.01); *H04L 61/609* (2013.01); *H04L 61/6054* (2013.01); *H04W 64/00* (2013.01); *H04L 61/605* (2013.01)

(58) Field of Classification Search
CPC ...... H04W 4/02; H04W 64/00; H04L 61/605; H04L 61/609; H04L 61/2514; H04L 61/6054; H04L 29/12037
USPC ............. 455/456.2, 435.1, 456.1, 456.3, 458, 455/464; 370/466, 475
See application file for complete search history.

(56) References Cited

U.S. PATENT DOCUMENTS 8,531,995 B2 * 9/2013 Khan ...................... H04L 12/66 370/271
2006/0224752 A1 * 10/2006 Parekh .............. H04L 29/12066 709/230
2010/0067444 A1 * 3/2010 Faccin .................... H04W 4/22 370/328

* cited by examiner

Primary Examiner — Khai M Nguyen
(74) Attorney, Agent, or Firm — Tarolli, Sundheim, Covell & Tummino LLP

(57) ABSTRACT

A mobile IP location server that retrieves the location of a mobile device based on the public IP address that a mobile device is using. A mobile IP location server comprises a mobile location protocol interface, an identifier resolver, and a location manager. The mobile location protocol interface interacts with location applications and receives and responds to location requests. The identifier resolver converts a device's public IP address to a real mobile identifier (e.g. MSISDN) and performs address conversion by either interacting with an HTTP proxy server or querying a network address translation (NAT) table. The location manager retrieves the location of a mobile device given the device's real mobile identifier (e.g. MSISDN). A web application requests mobile IP location services by transmitting an IP request to the mobile IP location server. An IP location request contains a mobile device's public IP address, port number, and any application specific information.

21 Claims, 7 Drawing Sheets

MOBILE INTERNET PROTOCOL (IP) LOCATION

The present application is a continuation of U.S. application Ser. No. 14/198,027, entitled "Mobile Internet Protocol (IP) Location", filed on Mar. 5, 2014; which is a continuation of U.S. application Ser. No. 13/402,406 entitled "Mobile Internet Protocol (IP) Location", filed on Feb. 22, 2012, now U.S. Pat. No. 8,682,321; which claims priority from U.S. Provisional No. 61/457,316, entitled "Mobile Internet Protocol (IP) Location", to Zhu, filed Feb. 25, 2011; and from U.S. Provisional No. 61/573,086, entitled "Mobile Internet Protocol (IP) Location", to Zhu, filed Aug. 30, 2011; the entirety of all four of which are explicitly incorporated herein by reference.

BACKGROUND OF THE INVENTION

1. Field of the Invention

This invention relates generally to wireless Internet Service Providers (ISPs), and information content delivery services/providers. More particularly, it relates to location services for the wireless industry and Web content providers.

2. Background of Related Art

Computer networks amass a collection of digital devices (e.g. computers, mobile devices, etc.), and cooperate with one another to permit communication amongst devices integrated within.

Every device that operates on a computer network is allotted a unique numerical identifier. An Internet Protocol address (IP address), for instance, is a numerical identifier assigned to each device operating on a Transmission Control Protocol/Internet Protocol (TCP/IP) network. An IP address enables a specific network node (e.g. a computer) to be targeted in a communication session and/or an information transmission. Moreover, an IP address identifies the location of a particular device on a network, permitting a communication session and/or an information transmission to be routed accurately.

An IP address is either statically or dynamically assigned to a network device.

A dynamically assigned IP address is allocated to a device each time the device accesses a network (e.g. each time a computer is booted), and/or each time an inherent timer has expired. A dynamic IP address is not fixed for any specific network device. Rather, a multitude of various dynamic IP addresses may be assigned to a host throughout the course of a network session.

Alternatively, a statically assigned IP address is permanently allocated to a network node. In particular, a static IP address is configured manually in the hardware or software portion of a device and thus provides a constant source of identification.

Two versions of the Internet Protocol are currently in use: Internet Protocol version 4 (IPv4) and Internet Protocol version 6 (IPv6). IPv4 and IPv6 each deploy variant addressing schemes.

IPv4 addresses are 32 bits long, yielding an address space that consists of $2^{32}$ unique IP addresses. Recently, as a result of the monumental growth of the internet, the supply of unallocated IPv4 public IP addresses (i.e. globally unique IP addresses that may be routed on the internet) has rapidly diminished.

Consequently, IPv6 was developed to broaden the supply of available address space. An IPv6 address contains 128 bits, providing $2^{128}$ unique IP addresses, which is enough to provide global unique IP addresses to all digital devices. Yet, the majority of today's network operators continue to use IPv4. Thus, several methods have been enacted in an attempt to conserve IPv4 address space.

For instance, one address conservation tactic incorporates private IP addresses. A private IP address is not globally unique and therefore not routable on the internet. Rather, private IP addresses are reserved for private networks, upon which devices primarily communicate and transfer information amongst other locally connected devices. Devices on a private network do not engage in frequent connectivity with outside networks, nor are they directly connected to the internet. Hence, as opposed to a globally unique public IP address, a private IP address is only required to be unique to devices operating on a common private network. Therefore, private IP addresses are essentially unique local addresses, enabling a range of private IP addresses to be reused over a multitude of private networks.

When a device on a private network attempts to access the internet, the device's private IP address is first converted to a public IP address. Address conversion masks a requesting device's private IP address, rendering the address undetectable to external network devices. Address conversion is commonly achieved via Network Address Translation (NAT).

FIG. 4 portrays a conventional network topology incorporating a Network Address Translation (NAT) enabled device.

A device 400 with Network Address Translation (NAT) functionality (e.g. a router, a gateway, a firewall, etc.) is situated between a private network 410 and a public network 420 (e.g. the internet). Private network addresses are not routable on the internet. Therefore, any device on a private network 410 attempting to access a node (e.g. a web server) on a public network 420 (e.g., the internet) must first pass communication through a Network Address Translation (NAT) enabled device 400. Network Address Translation (NAT) 400 converts a private IP address to a public IP address, and vice-versa, by referencing and recording address transformations in a Network Address Translation (NAT) table 430.

FIG. 5 portrays a conventional transmission of an IP packet from a private network node to a public network node using Network Address Translation (NAT).

A Network Address Translation (NAT) enabled device is furnished with a pool of globally unique public IP addresses. In step 500, a device with a private IP address transmits an IP packet to a device (e.g. a web server) operating on a public network. As depicted in step 510, the Network Address Translation (NAT) device on the private network intercepts the transmitted IP packet. Network Address Translation (NAT) then converts the source address in the transmitted IP packet from a private IP address to a public IP address, selected from the Network Address Translation (NAT) routable address pool, as shown in step 520. In step 530, Network Address Translation (NAT) subsequently records the new public/private IP address combination in the Network Address Translation (NAT) table for future lookup. The same address conversion is performed in all subsequent IP packets transmitted across the same line of communication.

FIG. 6 portrays a conventional transmission of an IP packet from a public network node to a private network node using Network Address Translation (NAT).

An IP packet is transmitted from a public network node to a private network node, as depicted in step 600. The transmitted IP packet is subsequently intercepted by a Network Address Translation (NAT) enabled device, configured at an entry point on the receiving private network, as shown in step 610. Network Address Translation (NAT) detects the destination address designated in the received IP packet and queries the Network Address Translation (NAT) table for a match in step 620. If a match is detected (step 630), the public IP address in the packet destination address field is converted to an affiliated private IP address in step 650, as recorded in the Network Address Translation (NAT) table. The packet is thereafter routed to an appropriate destination device in step 660. In the event that a match is not discovered in the Network Address Translation (NAT) table, the packet is dropped (step 640).

A proxy server may alternatively function as a gateway device between a private network and a public network.

FIG. 7 depicts a conventional network topology incorporating a proxy server.

As depicted in FIG. 7, a proxy server 700 is situated between a public network 720 and a private network 710 (i.e. a proxy server 700 is configured at an entry node on a private network 610). A network topology deploying a proxy server 700 routes all communication/information requests transmitted from a private network 710 to a public network 720, and vice versa, through the proxy server 700.

Similar to Network Address Translation (NAT), a proxy server may shield the identity of a device on a private network from being exposed to the internet. A proxy server is also able to modify received IP packets before forwarding packets to an intended destination. Therefore, a proxy server may perform address conversion in an IP packet and additionally append any relevant application specific information.

The location of a public IP address assigned to a device is currently obtainable on the internet via request to a suitable web service. For instance, http://www.ip2location.com enables a user to supply an IP address in return for location information.

There are numerous situations in which the location of a web client associated with a particular Internet session would be beneficial to a business. For instance, a bank may desire the location of a client requesting online banking resources for security purposes (e.g. authentication and/or anti-fraud). IP location services may additionally be beneficial in law enforcement scenarios and assisting in 911 emergency location determination. Moreover, IP location services enable a business to target promotional information to relevant consumers based on a device's proximity to a particular site of interest. IP location services furthermore enable a business to engage in location based advertising.

There are companies (e.g. Quova) that provide commercial IP location services. However, current IP location services are only applicable to wireline networks (e.g. cable or DSL ISP providers) where static location of each individual user can be pre-provisioned.

Unfortunately, location information associated with a public IP address that is allocated to a mobile device is not available. Instead, current IP location services are merely able to provide the identity of an internet service provider (ISP) that owns an IP address assigned to a mobile device. Hence at the moment, it is not possible to locate a mobile device based upon the public IP address that a mobile device is using.

Wireless packet data services are provided by most wireless carriers using various technologies (e.g. UMTS, LTE, CDMA1x, WiMAX, WiFi hotspots, etc.). While smart phones with high processing power and a high resolution display are popular, more people are using mobile phones to access web interfaces via a built-in web browser. Consumers desire an IP location service that is able to provide location information based upon a mobile device's IP address.

SUMMARY OF THE INVENTION

In accordance with the principles of the present invention, a mobile Internet protocol (IP) location server comprises a mobile location protocol interface to receive an Internet protocol (IP) location request for location of a given mobile device. An identifier resolver converts a public Internet protocol (IP) address supplied in the IP location request, to a real mobile identifier of the given mobile device. A location manager obtains a geographic location of the given mobile device based upon the real mobile identifier of the given mobile device.

A method of providing location for a mobile device in a private network in accordance with another aspect of the invention comprises receiving an Internet protocol (IP) location request for location of a given mobile device from a requesting device. An owner of an IP address in the IP location request is determined. A real mobile identifier of the given mobile device is resolved based on a public IP address of the given mobile device. Location for the given mobile device is obtained using the real mobile identifier, and the obtained location is returned to the requesting device.

BRIEF DESCRIPTION OF THE DRAWINGS

Features and advantages of the present invention become apparent to those skilled in the art from the following description with reference to the drawings, in which.

DETAILED DESCRIPTION OF ILLUSTRATIVE EMBODIMENTS

In accordance with the principles of the present invention, a method and apparatus for acquiring a geographic location for a mobile device, based on a public IP address that the mobile device is using, comprises a mobile IP location server.

A web service requests mobile IP location services for a particular mobile device by transmitting an IP location request to the mobile IP location server, in accordance with the principles of the present invention. An IP location request preferably incorporates a mobile device's public IP address, a port number over which the mobile device is communicating, and an application type for the requesting web service.

A mobile IP location server is comprised of three functional elements: a mobile location protocol (MLP) interface, an identifier resolver, and a location manager.

All requests for location services are transmitted over the mobile location protocol (MLP) interface, in accordance with the principles of the present invention.

The identifier resolver converts a public IP address supplied in an IP location request, to a corresponding device's real mobile identifier, e.g., IMSI, MSISDN, etc. In accordance with the principles of the present invention, the identifier resolver performs address conversion by querying either a Network Address Translation (NAT) enabled device or an HTTP proxy server configured on a mobile device's serving network.

In accordance with the principles of the present invention, the location manager utilizes existing location services to obtain a geographic location for a mobile device, based upon the device's real mobile identifier.

A mobile IP location server may be used for commercial IP location services, wherein city level civic location information is provided, with consideration of subscriber privacy settings. Additionally, a mobile IP location server may perform emergency IP location services (e.g. E-911 location determination), in which precise location is provided with full civic location.

The present invention provides a mobile IP location server that retrieves the location of a mobile device, based on the public IP address that the mobile device is using. A web service requests location information for a particular public IP address by transmitting an IP location request to the mobile IP location server, in accordance with the principles of the present invention.

Figure 1:
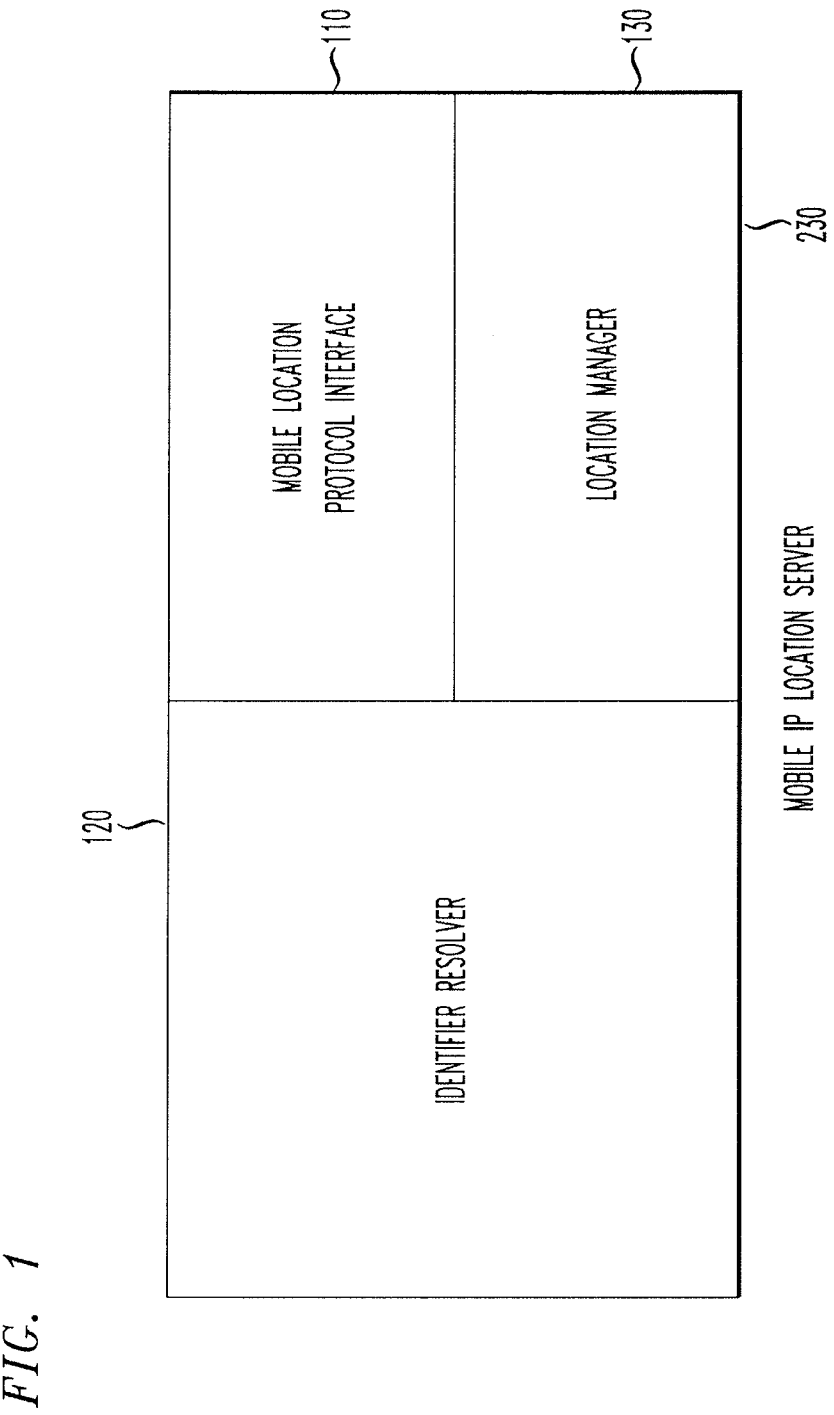
FIG. 1 portrays an exemplary mobile IP location server, in accordance with the principles of the present invention.

FIG. 1 portrays an exemplary mobile IP location server, in accordance with the principles of the present invention.

As depicted in FIG. 1, the mobile IP location server 230 comprises three main functional elements: a mobile location protocol (MLP) interface 110, an identifier resolver 120, and a location manager 130.

The mobile location protocol (MLP) interface 110 accepts all IP location requests transmitted to the mobile IP location server 230 and returns all IP location responses. A web service interacts with the mobile location protocol (MLP) interface 110 to request IP location services from the mobile IP location server 230. The mobile location protocol (MLP) interface 110 additionally interacts with location applications to request and obtain location information for particular public IP addresses.

The identifier resolver 120 interworks with network entities, e.g., a firewall, a Hypertext Transfer Protocol (HTTP) proxy server, a serving gateway and/or a Packet Data Network (PDN) gateway to convert a public IP address received for a mobile device to the device's real mobile identifier, e.g., IMSI, MSISDN, etc.

The location manager 130 is a location server (e.g. MPC, GMLC, etc.) that determines a mobile device's current geographic location via conventional mobile location services. A conventional mobile location service uses a device's real mobile identifier (e.g. IMSI, MSISDN, etc.) to obtain a geographic location for that device.

A web service requests IP location services by transmitting an IP location request to the mobile IP location server 100, in accordance with the principles of the present invention. In one particular embodiment, a web service may trigger the transmittal of an IP location request to the mobile IP location server 100, each instance the web service is accessed.

An IP location request preferably contains a mobile device's public IP address, the port number over which a mobile device is communicating, and an application type for the requesting web service.

Due to dynamic address allocation, a mobile device may be reassigned different public IP addresses as it moves and re-registers on a network. Moreover, a mobile device's public IP address may be periodically released on account of idle timeouts. Thus, a public IP address is not a constant source of identification and may not be used to directly identify a specific mobile device.

Moreover, existing control plane location services retrieve location information for a mobile device based on a device's real mobile identifier (e.g. ISMI, MSISDN, etc.), not a device's public IP address.

Therefore, unless a mobile device owns a static public IP address (i.e., a public IP address that remains constant), the public IP address supplied in an IP location request cannot be reliably used to directly identify or locate a mobile device.

The inventive mobile IP location server 100 retrieves a mobile device's real mobile identifier (e.g. IMSI, MSISDN, etc.) based upon the public IP address indicated in a received IP location request. The mobile IP location server 100 then queries a location service to obtain a geographic location for the relevant mobile device, based on the device's retrieved mobile identifier, e.g., IMSI, MSISDN, etc.

Figure 2:
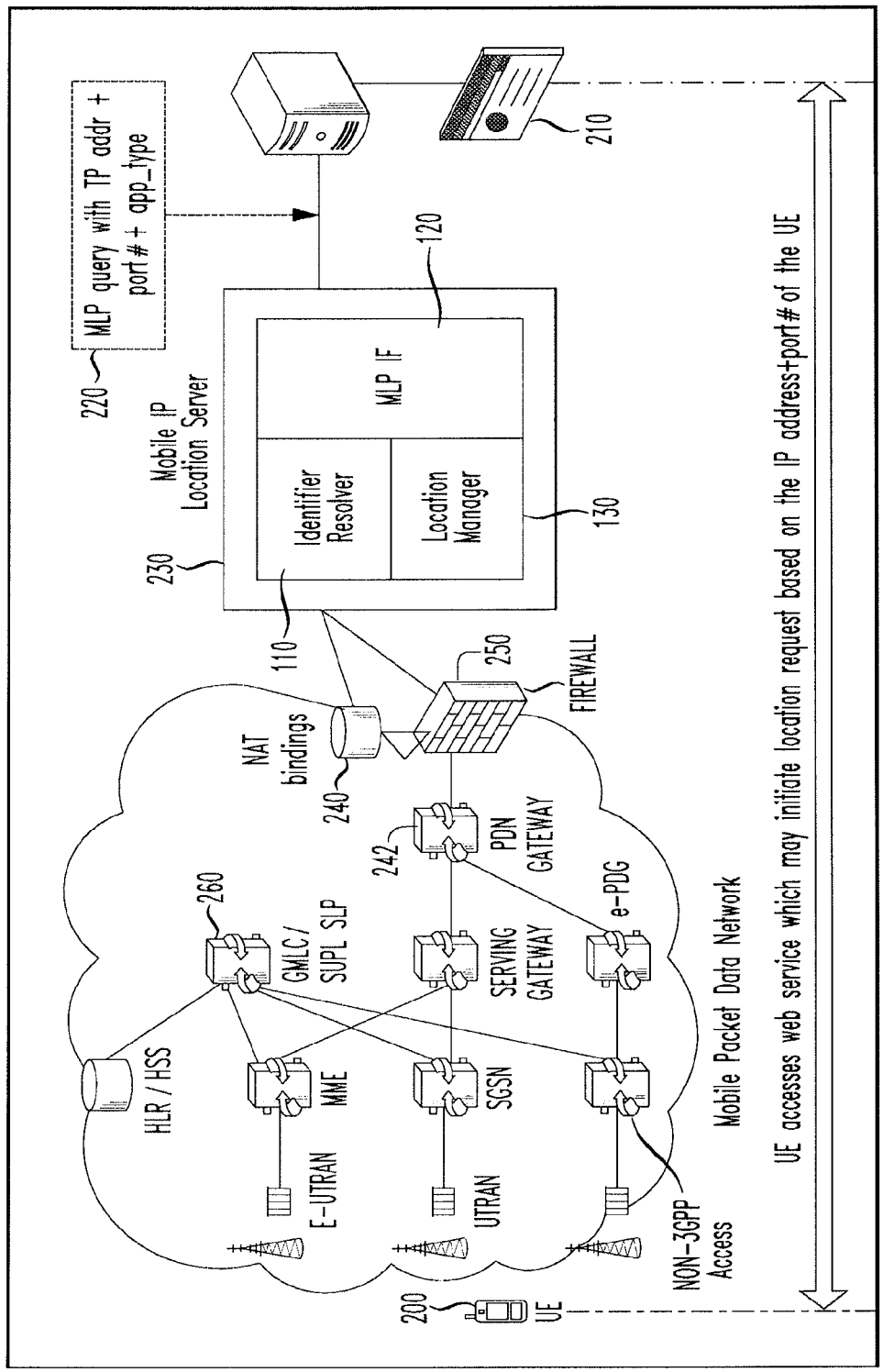
FIG. 2 illustrates exemplary high level architecture of IP Mobile Location Services in a 3GPP network environment (including the support of non-3GPP access), in accordance with the principles of the present invention.

FIG. 2 illustrates an exemplary high level architecture of a mobile IP location server 230 in a 3GPP network environment (including the support of non-3GPP access), in accordance with the principles of the present invention.

In accordance with the principles of the present invention, a mobile device 200 accesses a web service 210, which triggers an IP location request 220 to the mobile IP location server 230. The transmitted IP location request 220 incorporates the mobile device's 200 public IP address, port number, and an application type for the web service 210 that transmitted the request 220.

The mobile IP location server 230 interacts with a network address translation enabled device 240 or a proxy server 250 to convert the public IP address supplied in the IP location request to the corresponding device's real mobile identifier, e.g., ISMI, MSISDN, etc. Following address conversion, the mobile IP location server 230 initiates a location request to a location server 260 based on the mobile identifier (e.g., ISMI, MSISDN, etc.) retrieved for the relevant mobile device 200. Location information for the mobile device 200 is returned to the mobile IP location server 230 and forwarded to the web service 210 that initiated the IP location request 220.

Figure 3:
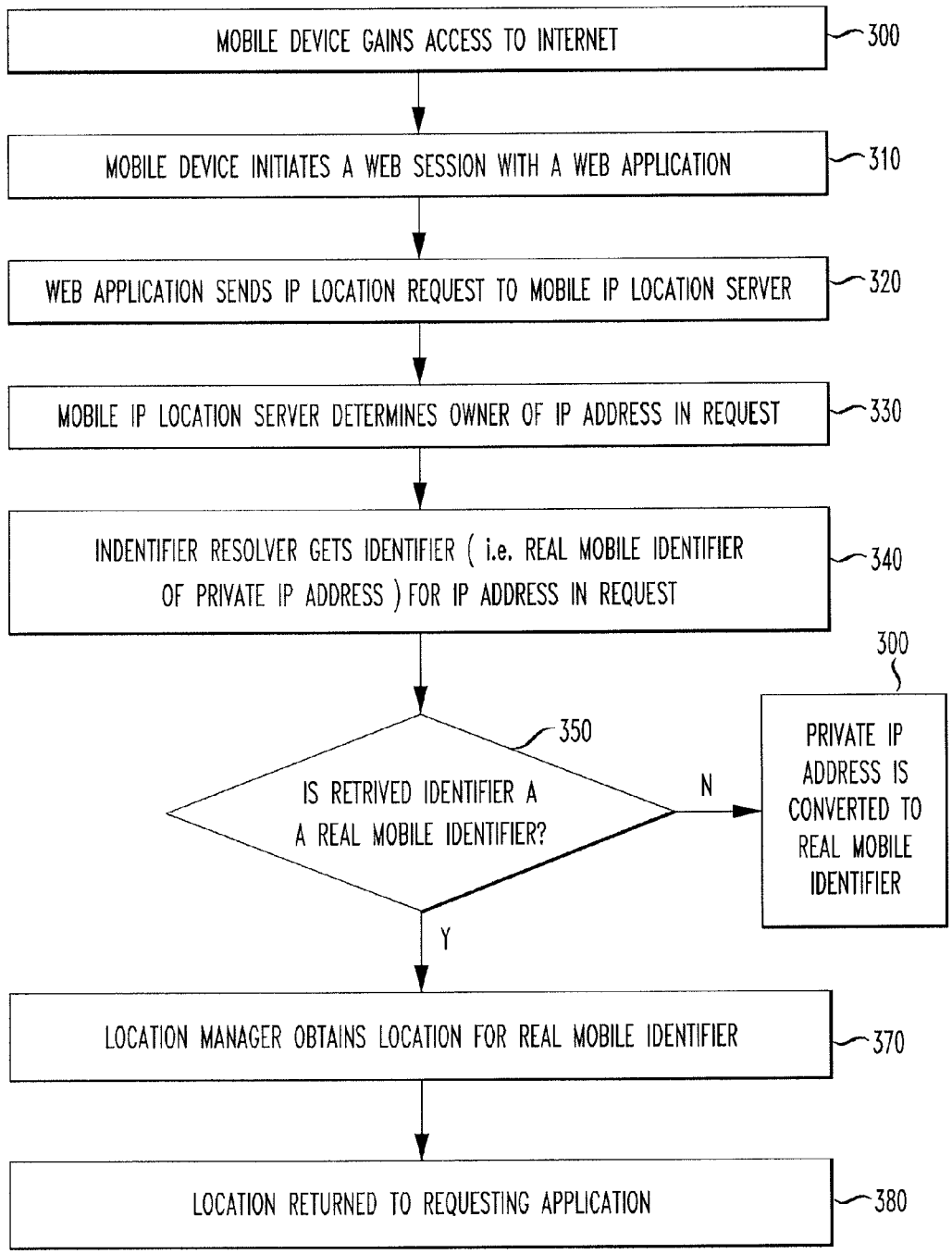
FIG. 3 illustrates an exemplary mobile IP location service flow using a mobile IP location server, in accordance with the principles of the present invention.
Figure 4:
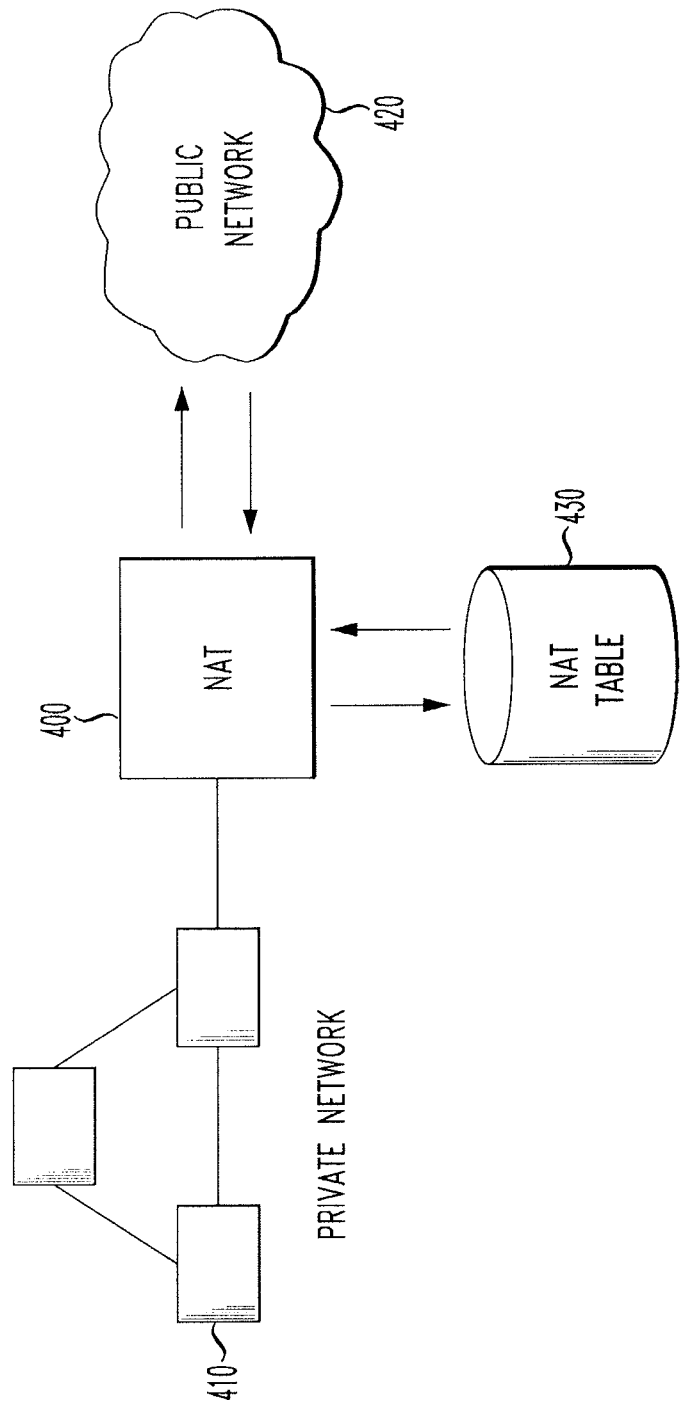
FIG. 4 portrays a conventional network topology incorporating a Network Address Translation (NAT) enabled device.
Figure 5:
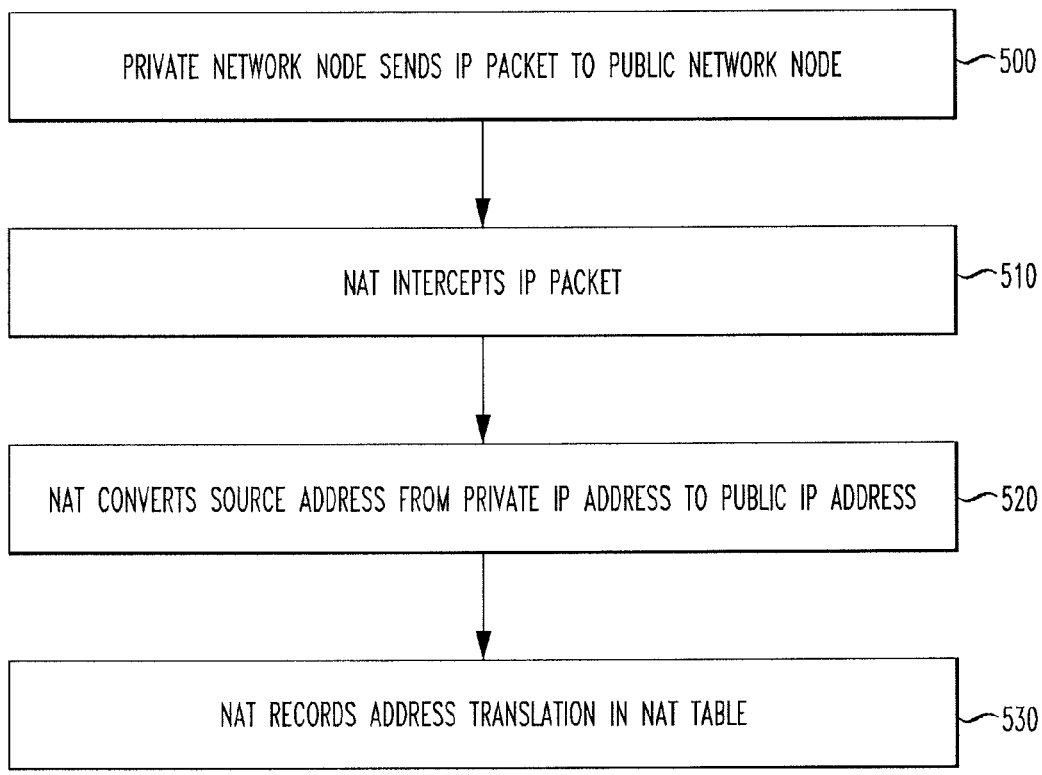
FIG. 5 portrays a conventional transmission of an IP packet from a private network node to a public network node using Network Address Translation (NAT).
Figure 6:
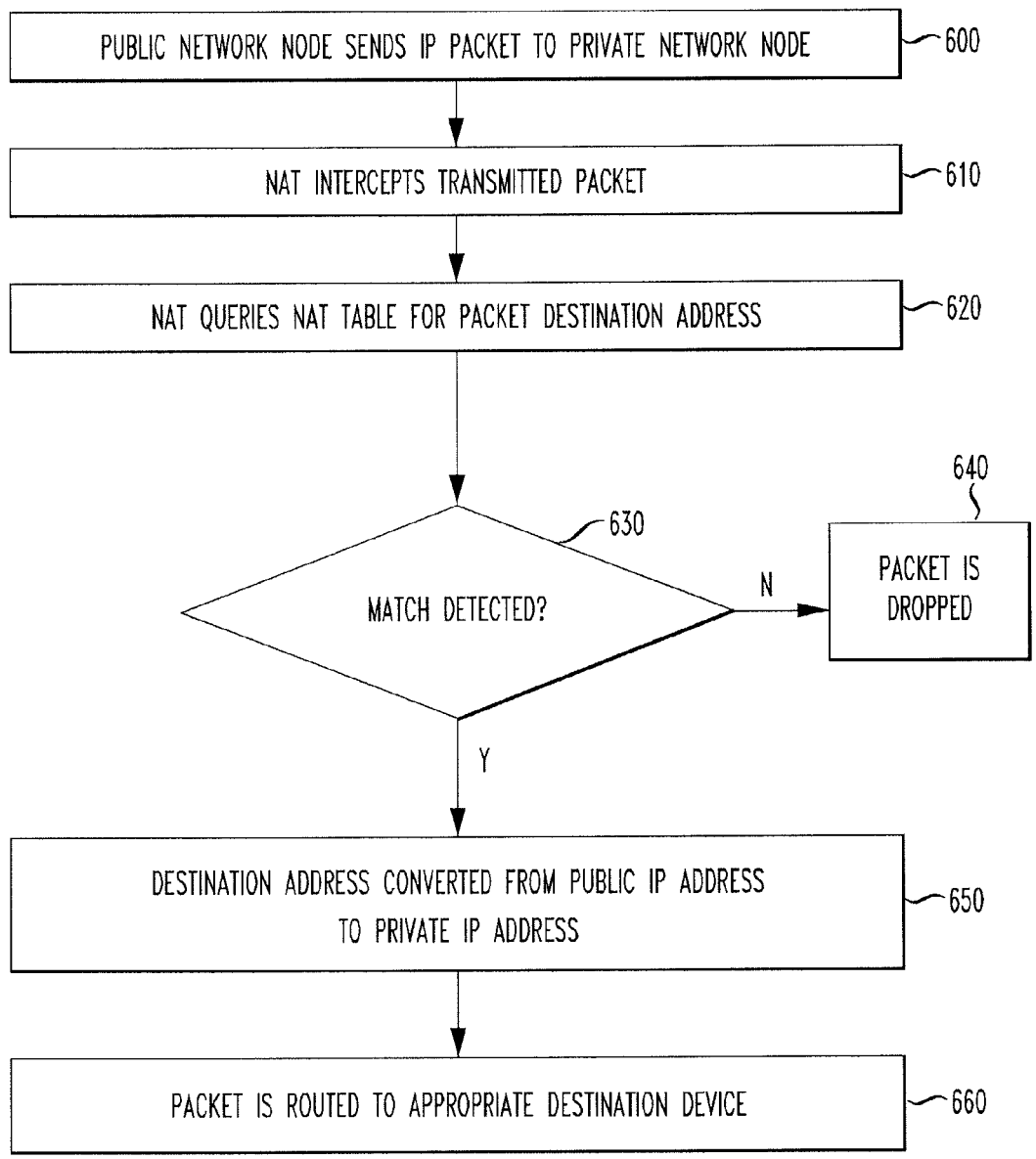
FIG. 6 portrays a conventional transmission of an IP packet from a public network node to a private network node using Network Address Translation (NAT).
Figure 7:
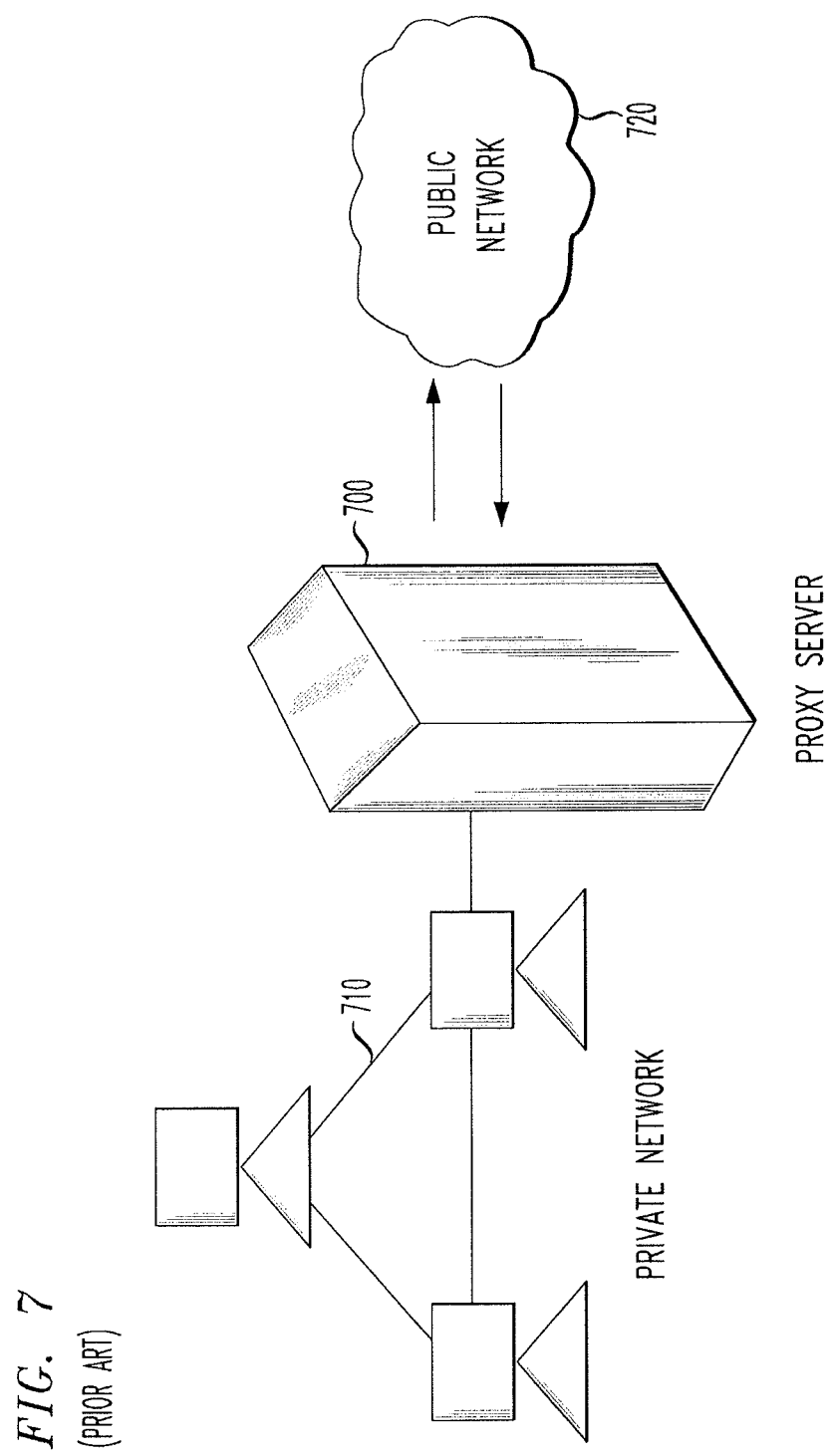
FIG. 7 depicts a conventional network topology incorporating a proxy server.

FIG. 3 illustrates an exemplary mobile IP location service flow using a mobile IP location server, in accordance with the principles of the present invention.

In step 300, a mobile device gains access to the Internet via an appropriate internet service provider. Internet service providers (e.g. Verizon Wireless, AT&T, etc.) conventionally administer IPv4 dynamic private IP addresses to mobile devices. Private IP addresses are not routable on the Internet. Thus, upon Internet access, the firewall on the device's serving network converts the device's private IP address to a public IP address, preferably via Network Address Translation (NAT).

In step 310, the mobile device 200 initiates a web service session 210 with a web service provider (e.g. an online banking service).

In step 320, the web service 210 that the mobile device 200 is accessing transmits an IP location request to the mobile IP location server 230, to attain location information for the requesting mobile device 200.

The web service 210 preferably transmits the IP location request 220 to the mobile IP location server 230 via a Live Communications Server (LCS) Client protocol over the mobile location protocol (MLP) Interface 120. The IP location request 220 preferably includes the mobile device's public IP address, port number, and any relevant application specific information (e.g. application type).

In step 330, the mobile IP location server 230 receives the transmitted IP location request 220, via the mobile location protocol (MLP) interface 120, and identifies the public IP address that is indicated within. The mobile IP location server 230 then determines the network operator that owns the public IP address received in the IP location request 220.

The owner of a public IP address is registered in the public domain. Therefore, the network/operator that an IP address belongs to may be determined via a database query to the IP address registry.

In an alternate embodiment, the mobile IP location server 230 maintains an IP address database for each mobile operator that the mobile IP location server 230 is serving. An inherent IP address database permits fast and accurate address lookup.

In yet another embodiment, a commercial provider company inserts network operator information into IP location requests sent to the mobile IP location server 230.

In step 340, address conversion is performed to accurately identify the mobile device 200 that corresponds to the public IP address indicated in the received IP location request 220. In particular, the identifier resolver converts the public IP address (e.g. IPv4) received for the mobile device 200 to a corresponding private IP address or real mobile identifier, e.g., IMSI, MSISDN, etc. Several mechanisms may be used to achieve this conversion.

One address conversion tactic the identifier resolver 110 may perform incorporates Network Address Translation (NAT). With authorization, the identifier resolver 110 may access a Network Address Translation (NAT) enabled device (e.g. a firewall at the proxy server 250) on the relevant device's serving network. The identifier resolver 110 may then initiate a request to query the Network Address Translation (NAT) table for the real mobile identifier of the mobile device 200, as documented in the NAT binding. The mobile identifier of the mobile device 200 is preferably returned in one of the following formats: MSISDN, IMSI, MSN, MIN, MDN, and/or a private IP address assigned to the mobile device 200.

Alternatively, the identifier resolver 110 may retrieve the mobile identifier and/or private IP address of the mobile device 200 by interacting with an HTTP proxy server 250 deployed on the mobile device's serving network.

An HTTP proxy server 250 on a network may insert a proprietary header in to each IP packet that is routed through the HTTP proxy server 250. The supplemental proprietary header may encompass an identifier that represents a transmitted IP packet's originating mobile device 200. However, to preserve user privacy, a device's true mobile identifier (e.g. IMSI, MSISDN, etc.) need not be used. Rather, a proxy server may maintain a database that maps identifiers inserted in a proprietary header to the real mobile identifiers (e.g. IMSI, MSISDN, etc.) they are being used to represent.

If this method is available, the identifier in a proprietary header should also be supplied in an IP location request 220 sent to the mobile IP location server 230. The identifier resolver 110 may then interact with the HTTP proxy server 250 to query the proxy server's database for a real mobile identifier of the mobile device 200, using the identifier supplied in a received IP location request 220.

As shown in step 350, address conversion performed by the identifier resolver 110 results in a mobile device's real mobile identifier (e.g. MSISDN, IMSI, MSN, MIN, and/or MDN) or a corresponding private IP address.

If address conversion yields a private IP address, then the retrieved private IP address must be converted to a real mobile identifier (step 360) before location services may be applied.

To convert a private IP address to a real mobile identifier (e.g. IMSI, MSISDN, etc.), the identifier resolver 110 determines the serving gateway that owns the relevant private IP address. The identifier resolver 110 may then retrieve the mobile identifier (e.g. IMSI, MSISDN, etc.) and current serving node (e.g. SGSN, MME, etc.) affiliated with the private IP address, from the serving gateway or Packet Data Network (PDN) gateway 242 that is serving the mobile device 200.

The PDN gateway 242 may either belong to a mobile operator or reside in an enterprise (e.g. Blackberry™ by Research in Motion uses IP addresses assigned by the enterprise where the RIM server is hosted).

When IPv6 is used, a private IP address assigned to a mobile device may be the same address used to access the internet. Thus, address conversion is not necessary in an IPv6 implementation.

In step 370, once the mobile IP location server 230 retrieves the real mobile identifier of the mobile device 200 and serving node address (optional), the location manager 130 requests the location of the mobile device 200 via standard location procedures (e.g. MPC, SUPL SLP, or GMLC). A location request 220 incorporating the real mobile identifier of the mobile device 200 and optional serving node address, is transmitted to the location manager 130 over the mobile location protocol (MLP) interface 120.

In step 380, the location manager 130 transmits a geographic location for the mobile device 200 to the mobile IP location server 230, over the mobile location protocol (MLP) interface 120. The mobile IP location server 230 subsequently returns the retrieved location information to the web service 210 that transmitted the IP location request 220.

It is preferred that the mobile IP location server 230 cache the results of a location request. Caching may be performed by assigning a key to location results to use in location rebids. A cached location may be configured with a stale age, in accordance with the principles of the present invention. Once a cached location expires based on stale age, the cached location is deleted and the expired location key results in error.

Mobile IP location services may potentially conflict with a subscriber's privacy settings. However, despite location privacy configurations, the present invention may still perform emergency location services and conventional commercial location requests.

If an emergency IP location request (i.e. EME_LIR) for a mobile device with location privacy is transmitted to the mobile IP location server 230, the mobile IP location server 230 may override privacy configurations. The mobile IP location server 230 may return precise location information to the requesting web application 210, along with the civic location of the serving Cell-ID of the mobile device 200.

Alternatively, if a commercial IP location request 220 for a mobile device 200 with location privacy is transmitted to the mobile IP location server 230, the mobile IP location server 230 may provide only city level location information derived from the serving Cell-ID of the mobile device 200.

In an alternate embodiment, the mobile IP location server 230 may transmit a subscriber privacy notification to the mobile device 200 whenever the web service 210 requests location of the mobile device 200 via an IP location request 220.

The present invention preferably utilizes existing location services (e.g. 3GPP Control Plane based via GMLC, etc., OMA User Plane based via SUPL SLP, or MPC for 3GPP2).

The present invention may be used in conjunction with the following wireless access technology: 3GPP based packet data using GERAN, UTRAN, or E-UTRAN radio access, Wireless LAN based on IEEE 802.11x, Wireless Personal Area Network Based on IEEE 802.15, Worldwide Interoperability for Microwave Access or Wireless metropolitan area network based on IEEE 802.16, 2GPP2 packet data access technologies (e.g. 1xEVDO based), Packet Data Access over Satellite, and high packet data access over speed point-to-point optical link (e.g. based on 802.17). Moreover, the present invention is applicable to other network types (e.g. CDMA2000 1X network).

The present invention has particular applicability to localized web content, location orient advertising, local weather applications, automatic product configuration, fraud detection or prevention, user authentication, law enforcement applications, and digital rights management (e.g. digital rights of video and/or audio on demand).

While the invention has been described with reference to the exemplary embodiments thereof, those skilled in the art will be able to make various modifications to the described embodiments of the invention without departing from the true spirit and scope of the invention.

What is claimed is:

1. A method of providing location for a mobile device identified in an IP location request lacking a mobile identifier, comprising:
    receiving, at a physical mobile location server, an Internet protocol (IP) location request for a current geographic location of a given mobile device identified by said IP location request only with a public Internet Protocol (IP) address, said IP location request, said IP location request including application specific information;
    querying a Network Address Translation (NAT) enabled device to resolve, with an identifier resolver associated with said physical mobile location server, a real mobile identifier of said given mobile device from said public IP address included with said IP location request;
    receiving, at said physical mobile location server, a current geographic location of said given mobile device based on said resolved real mobile identifier of said given mobile device and said application specific information included with said IP location request; and
    returning said current geographic location of said given mobile device to a requesting device initiating said IP location request.

2. The method of providing location for a mobile device identified in an IP location request lacking a mobile identifier according to claim 1, wherein:
    said current geographic location of said given mobile device is returned to said requesting device via IP protocol.

3. The method of providing location for a mobile device identified in an IP location request lacking a mobile identifier according to claim 1, wherein:
    said requesting device is a physical network server hosting a web application.

4. The method of providing location for a mobile device identified in an IP location request lacking a mobile identifier according to claim 1, wherein said real mobile identifier comprises:
    an International Mobile Subscriber Identity (IMSI).

5. The method of providing location for a mobile device identified in an IP location request lacking a mobile identifier according to claim 1, wherein said real mobile identifier comprises:
    a Mobile Station International Subscriber Directory Number (MSISDN).

6. A method of providing location for a mobile device identified in an IP location request lacking a mobile identifier, comprising:
    receiving, at a physical mobile location server, an Internet protocol (IP) location request for a current geographic location of a given mobile device identified by said IP location request only with a public Internet Protocol (IP) address, said IP location request;
    querying a Network Address Translation (NAT) enabled device to resolve, with an identifier resolver associated with said physical mobile location server, a real mobile identifier of said given mobile device from said public IP address included with said IP location request;
    receiving, at said physical mobile location server, a current geographic location of said given mobile device based on said resolved real mobile identifier of said given mobile device; and
    returning said current geographic location of said given mobile device to a requesting device initiating said IP location request.

7. The method of providing location for a mobile device identified in an IP location request lacking a mobile identifier according to claim 6, wherein:
    said current geographic location of said given mobile device is returned to said requesting device via IP protocol.

8. The method of providing location for a mobile device identified in an IP location request lacking a mobile identifier according to claim 6, wherein:
    said requesting device is a physical network server hosting a web application.

9. The method of providing location for a mobile device identified in an IP location request lacking a mobile identifier according to claim 6, wherein said real mobile identifier comprises:
    an International Mobile Subscriber Identity (IMSI).

10. The method of providing location for a mobile device identified in an IP location request lacking a mobile identifier according to claim 6, wherein said real mobile identifier comprises:
    a Mobile Station International Subscriber Directory Number (MSISDN).

11. A method of providing location for a mobile device identified in an IP location request lacking a mobile identifier, comprising:
    receiving, at a physical mobile location server, an Internet protocol (IP) location request for a current geographic location of a given mobile device identified by said IP location request only with a public Internet Protocol (IP) address, said IP location request, said IP location request including application specific information;
    querying a physical HTTP proxy server configured on a network associated with said given mobile device, with an identifier resolver associated with said physical mobile location server, a real mobile identifier of said given mobile device from said public IP address included with said IP location request;
    receiving, at said physical mobile location server, a current geographic location of said given mobile device based on said resolved real mobile identifier of said given mobile device and said application specific information included with said IP location request; and
    returning said current geographic location of said given mobile device to a requesting device initiating said IP location request.

12. The method of providing location for a mobile device identified in an IP location request lacking a mobile identifier according to claim 11, wherein:
    said current geographic location of said given mobile device is returned to said requesting device via IP protocol.

13. The method of providing location for a mobile device identified in an IP location request lacking a mobile identifier according to claim 11, wherein:
said requesting device is a physical network server hosting a web application.

14. The method of providing location for a mobile device identified in an IP location request lacking a mobile identifier according to claim 11, wherein said real mobile identifier comprises:
an International Mobile Subscriber Identity (IMSI).

15. The method of providing location for a mobile device identified in an IP location request lacking a mobile identifier according to claim 11, wherein said real mobile identifier comprises:
a Mobile Station International Subscriber Directory Number (MSISDN).

16. A method of providing location for a mobile device identified in an IP location request lacking a mobile identifier, comprising:
receiving, at a physical mobile location server, an Internet protocol (IP) location request for a current geographic location of a given mobile device identified by said IP location request only with a public Internet Protocol (IP) address, said IP location request;
querying a physical HTTP proxy server configured on a network associated with said given mobile device, with an identifier resolver associated with said physical mobile location server, a real mobile identifier of said given mobile device from said public IP address included with said IP location request;
receiving, at said physical mobile location server, a current geographic location of said given mobile device based on said resolved real mobile identifier of said given mobile device; and
returning said current geographic location of said given mobile device to a requesting device initiating said IP location request.

17. The method of providing location for a mobile device identified in an IP location request lacking a mobile identifier according to claim 16, wherein:
said IP location request includes application specific information; and
said current geographic location of said given mobile device is resolved based both on said resolved real mobile identifier of said given mobile device, and on said application specific information included with said IP location request.

18. The method of providing location for a mobile device identified in an IP location request lacking a mobile identifier according to claim 16, wherein:
said current geographic location of said given mobile device is returned to said requesting device via IP protocol.

19. The method of providing location for a mobile device identified in an IP location request lacking a mobile identifier according to claim 16, wherein:
said requesting device is a physical network server hosting a web application.

20. The method of providing location for a mobile device identified in an IP location request lacking a mobile identifier according to claim 16, wherein said real mobile identifier comprises:
an International Mobile Subscriber Identity (IMSI).

21. The method of providing location for a mobile device identified in an IP location request lacking a mobile identifier according to claim 16, wherein said real mobile identifier comprises:
a Mobile Station International Subscriber Directory Number (MSISDN).

* * * * *